Nov. 8, 1955
J. M. TYRNER
2,723,331
ARC WELDING APPARATUS
Filed April 26, 1951
3 Sheets-Sheet 1
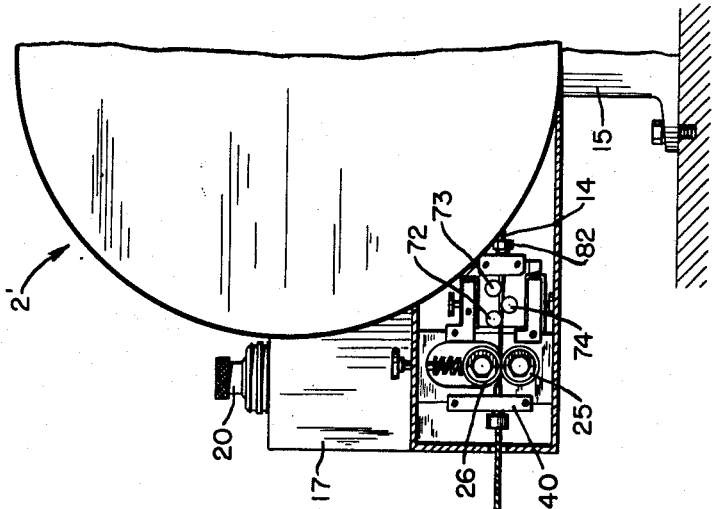
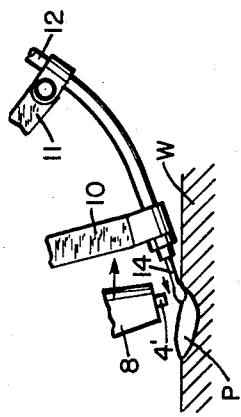
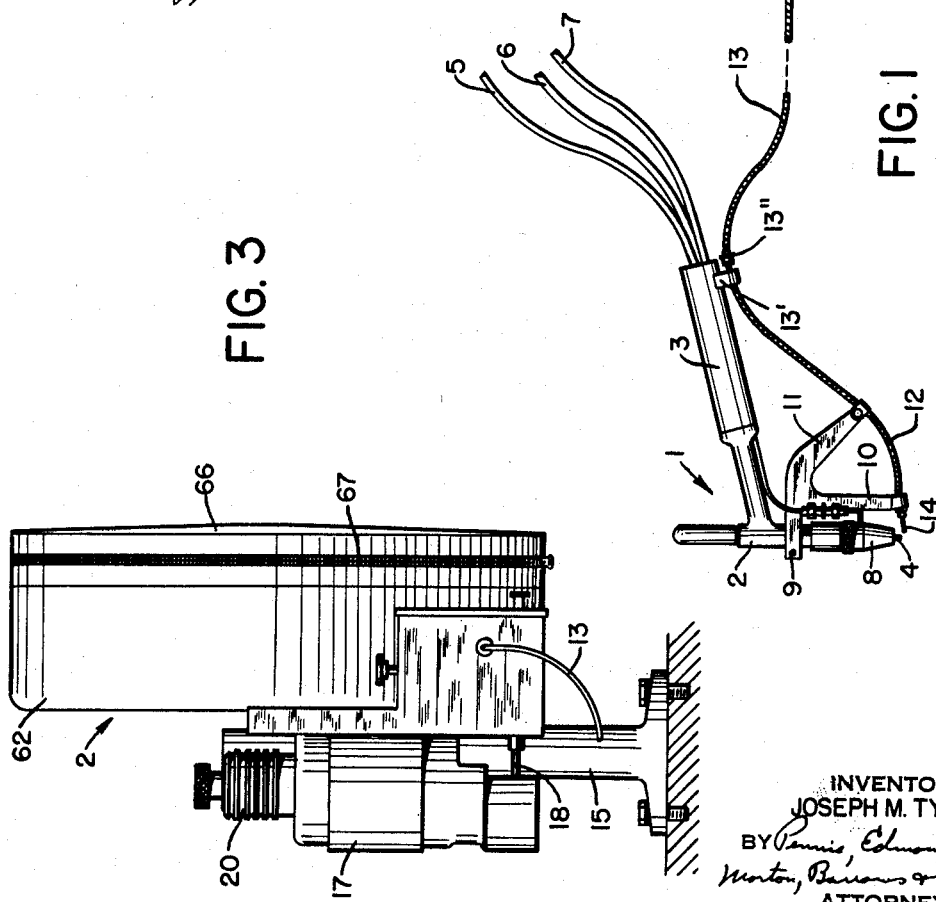
INVENTOR
JOSEPH M. TYRNER
BY *Pennie, Edmonds,*
*Morton, Barrows & Taylor*
ATTORNEYS Nov. 8, 1955

J. M. TYRNER 2,723,331

ARC WELDING APPARATUS

Filed April 26, 1951

INVENTOR
JOSEPH M. TYRNER
BY
ATTORNEYS

Nov. 8, 1955    J. M. TYRNER    2,723,331
ARC WELDING APPARATUS
Filed April 26, 1951                     3 Sheets-Sheet 3
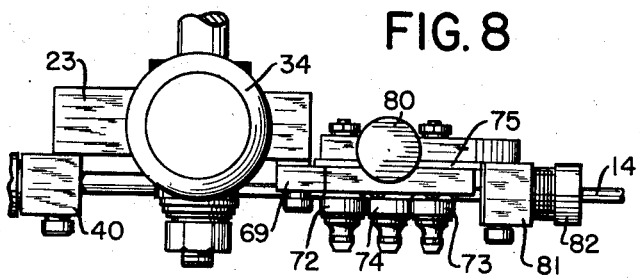
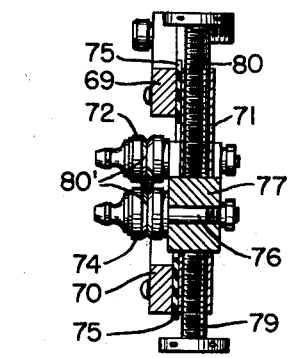
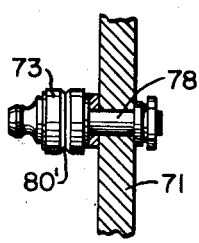
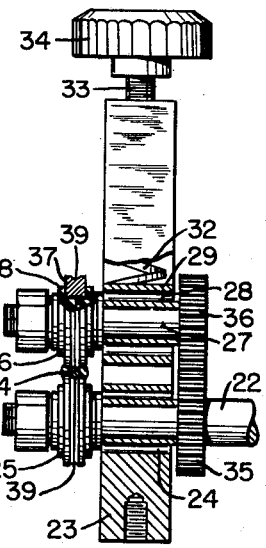
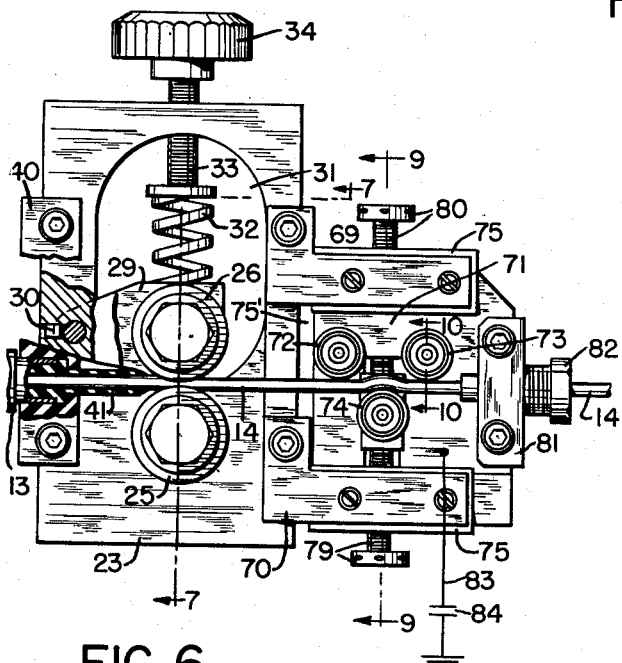
INVENTOR
JOSEPH M. TYRNER
ATTORNEYS

United States Patent Office 2,723,331
Patented Nov. 8, 1955

2,723,331

ARC WELDING APPARATUS

Joseph M. Tyrner, Brookside, N. J., assignor to Air Reduction Company, Incorporated, New York, N. Y., a corporation of New York Application April 26, 1951, Serial No. 223,037

3 Claims. (Cl. 219—8)

This invention relates to welding apparatus of the type in which the welding heat is produced either by an electric arc or a gas flame.

When welding by means of a gas torch it is common practice to feed filler metal, in the form of a wire or rod, to the weld. Also when arc welding it is frequently desirable to feed filler metal to the weld especially if the electrode employed is of the non-consuming type which does not deposit metal in the weld.

I have discovered that if a welding torch of the gas flame type or the electric arc type is supplemented by means for automatically feeding filler wire to the weld, and if the filler wire is fed against the work in proper relation to the weld puddle and at the proper angle with respect to the work surface, the feeding of the filler wire will automatically propel the torch along the seam to be welded in a direction opposite to that in which the filler wire is fed, provided that when the torch is of the manual type the operator merely guides the torch to cause it to follow the seam but does not resist its movement along the seam caused by the feeding of the filler wire, and that when the torch is not of the manual type it is mounted on a freely movable carriage or the like which will allow it to be moved along the seam by the feeding of the filler wire and will guide it so that it follows the seam.

The principal object of the invention, therefore, is to provide welding apparatus having means for so feeding filler wire to the weld that the welding torch is caused by the feeding of the filler wire to progress along the seam to be welded.

When the welding apparatus is of the electric arc type and has electrically operated means for feeding the filler wire to the weld it is desirable that the feeding of the filler wire take place only during the actual welding operation, and it is therefore another object of the invention to provide arc welding apparatus in which the electrically operated means for feeding the filler wire is controlled by arc voltage in such a way that the filler wire will be fed only during the existence of a welding arc.

When the welding apparatus is of the electric arc type and comprises a hand torch or electrode holder for manual welding, it is desirable that the apparatus include high-frequency arc starting means because it is not always feasible to bring the electrode into contact with the work and then retract it to strike the arc due to the filler wire which projects toward the tip of the electrode. When the filler wire passes between rolls such as feed rolls, or rolls that may be employed to straighten the filler wire on its way to the weld, and the rolls are insulated from ground, it has been found that if the high-frequency means is used to produce an arc when the end of the filler wire is not in contact with the work the high-frequency current has a tendency to follow the filler wire and produce a discharge across the insulation at the feed rolls or wire straightening rolls and this discharge makes a conductive path across the insulation for the welding current which may then establish an intense arc at this place. It is an additional object of the invention to provide arc welding apparatus of this type with means which will prevent this condition from occurring.

The invention is illustrated in the accompanying drawings in its application to manual arc welding apparatus. In the drawings:

Figure 1 is a broken side elevation of manual arc welding apparatus embodying the invention including a manual welding torch or electrode holder and a filler wire feeding unit for feeding filler wire to the welding torch.

Fig. 2 is an enlarged side elevation of the lower end only of a welding torch and the filler wire guide tube showing the relationship between the welding torch, the work, the weld puddle, and the portion of the filler wire that is fed from its guide tube into contact with the work at the forward edge of the weld puddle.

Fig. 3 is an end elevation of the filler wire feeding unit alone.

Fig. 6 is a side elevation, partly in vertical section, of the filler wire feed roll unit and the straightening roll unit shown in Fig. 1 but drawn to a larger scale.

Fig. 7 is a vertical section through the feed roll unit shown in Fig. 6 taken along the line 7—7 of Fig. 6.

Fig. 8 is a top plan view of the filler wire feed roll unit and straightening roll unit shown in Fig. 6.

Fig. 9 is a vertical section through the straightening roll unit taken on the line 9—9 of Fig. 6, and Fig. 10 is a vertical section through the mounting of one of the straightening rolls taken on the line 10—10 of Fig. 6.

Figure 5:
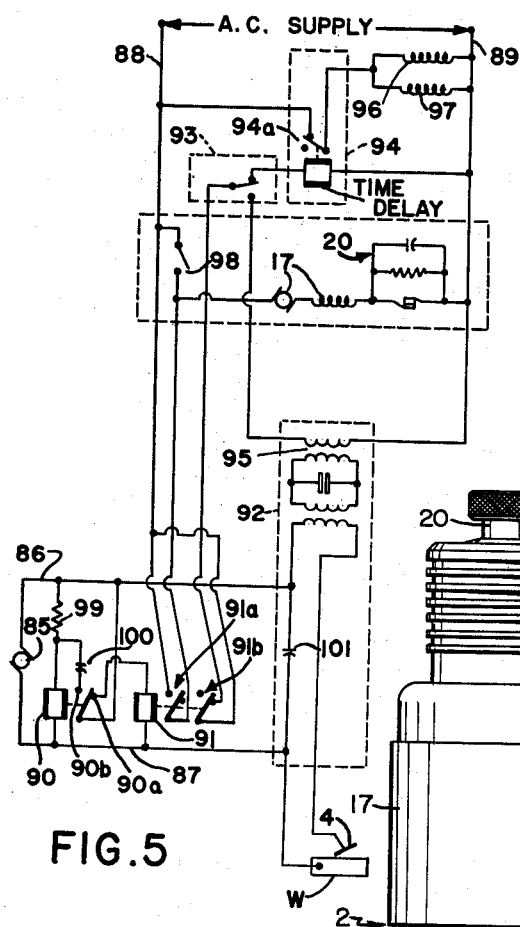
Fig. 5 is a simplified wire diagram of the electrical system.

Referring first to Fig. 1, a manual electrode holder or welding torch is shown at 1 and a filler wire feeding unit is shown at 2'. The electrode holder has an electrode holding portion 2 and a handle portion 3. The electrode holding portion is adapted to hold an electrode, the tip of which appears at 4. The electrode may be a non-consuming one such as a tungsten electrode. Cooling water is conducted to and from the electrode holder by a pair of hoses 5 and 6 and circulates through the electrode holder in the usual manner to cool it. An inert shielding gas such as argon or helium is supplied to the electrode holder through a flexible conduit 7. The conductor which supplies welding current to the electrode may pass through the water discharge hose 6. The sheilding gas issues from a nozzle 8 in an annular stream which surrounds the tip of the electrode and shields it as well as the arc and the weld puddle in a manner well understood in the art.

A bracket 9 is clamped to the portion 2 of the electrode holder and has two depending arms 10 and 11 which support a flexible tube 12 constituting a filler wire guide. The bracket 9 and clamp at 13' are secured to insulating materials which form parts of electrode holder 2 and handle portion 3, respectively. With this construction, the tube 12, bracket 9, and clamp at 13' are electrically insulated from the other parts of the electrode holder. Filler wire is fed to the tube 12 from the filler wire feed unit 2' through an insulation-covered flexible conduit 13 connected to tube 12 by a joint 13''. The arms 10 and 11 of the bracket 9 support the guide tube 12 for the filler wire in such a way that the end of the filler wire may project out of the guide to a region substantially below the tip of the electrode as shown at 14.

Figure 4:
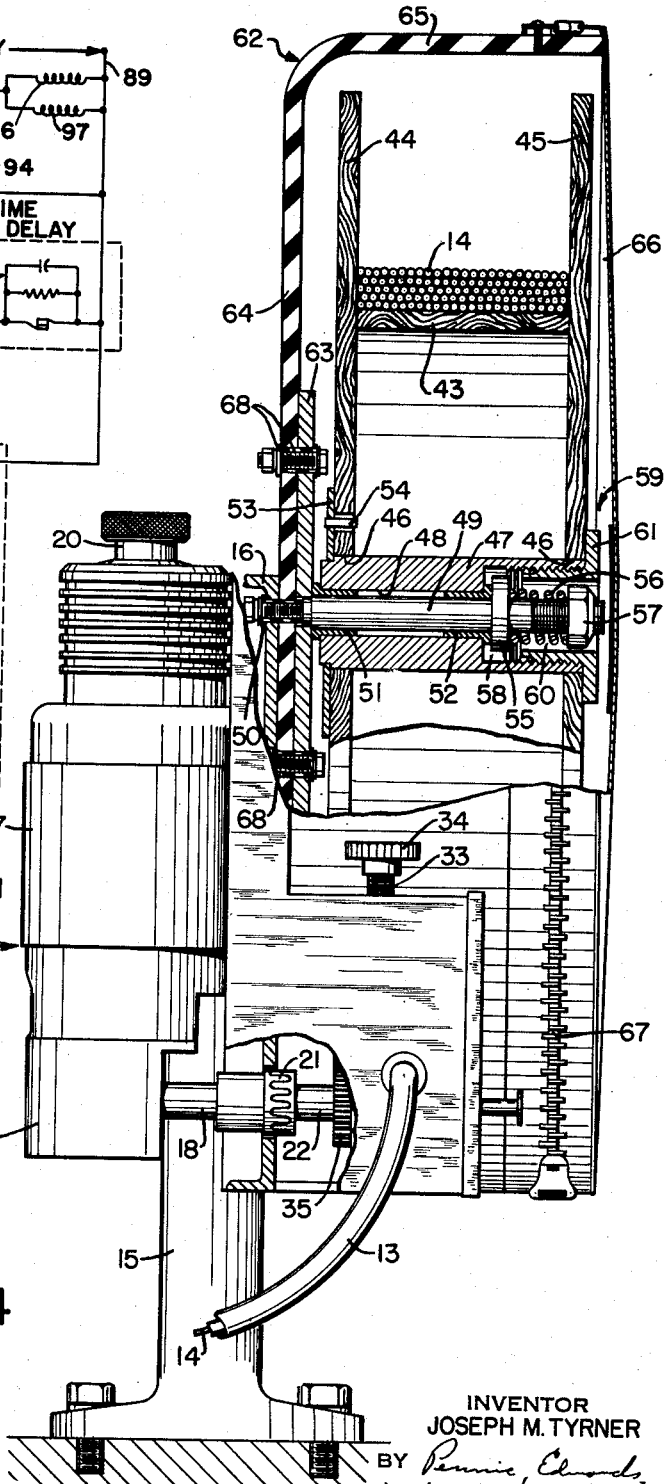
Fig. 4 is an end elevation, partly in vertical section, of the filler wire feeding unit alone, this figure being drawn to a larger scale than Fig. 3.

The filler wire feed unit 2', except for the hereinafter described wire straightening rolls which may be incorporated in it if desired may be of the type disclosed and claimed in the copending application of Nelson E. Anderson, Serial No. 182,488, filed August 31, 1950, now U. S. Patent 2,681,401 granted June 15, 1954 assigned to the same assignee as the present application. The feed unit may be supported on a pedestal 15 as shown in Figs. 1, 3 and 4, or in any other suitable way. The unit comprises a main frame 16 supported by the pedestal 15 (Fig. 4). An electric motor 17 is carried by the frame 16 and drives a shaft 18 through reduction gearing in a gear box 19. The motor is provided with an adjustable speed control governor 20 which may be set to cause the motor to drive the shaft 18 at a preselected constant speed. The shaft 18 is mechanically coupled by a coupling 21 to the shaft 22 which drives the filler wire feed rolls.

The feed roll unit itself is best shown in Figs. 6 and 7. It comprises a plate 23 supported by the frame 16 and in which the shaft 22 is journaled by means of a suitable bearing 24 preferably of the needle or roller type. A wire feed roll 25 is fixed to the shaft 22 at one side of the plate 23. A second cooperating feed roll 26 is fixed to a shaft 27 which is journaled by means of a bearing 28 in a rocker arm 29 pivotally connected to the plate 23 by means of a pin 30 (Fig. 6). The rocker arm 29 operates in an opening 31 provided in the plate 23 and a coil spring 32 bears down on the rocker arm and reacts at its upper end against an adjusting screw 33 which may be turned by means of a knob 34. Thus the feed roll 26 is a floating roll and is yieldingly urged by the spring 32 toward the fixed feed roll 25. At the side of the plate 23 opposite the feed rolls 25 and 26 the feed roll shafts 22 and 27 are interconnected by gears 35 and 36, the gear 35 being fixed to the shaft 22 and the gear 36 being fixed to the shaft 27. It will thus be seen that when the shaft 22 is driven by the motor 17 both feed rolls are positively driven. The filler wire 14 passes between the two feed rolls and is drawn by them from the reel hereinafter described and pushed by them through the flexible conduit 13 to the guide tube 12 on the welding torch. Each of the feed rolls has a steel tread 37 (Fig. 7) mounted on a hub portion 38 of hard insulating material which in turn is fixed to the shaft which carries the feed roll. The treads of the feed rolls are circumferentially grooved as shown at 39 to receive and guide the filler wire but they are otherwise smooth.

The gears 35 and 36 are of the type which will remain in driving engagement throughout the small range of movement of the rocker arm 29. Spring 32 maintains a constant pressure between the feed rolls to assure adequate friction for uniform and uninterrupted wire feeding. This pressure may be varied at will by turning the knob 34 to adjust the screw 33.

A block of insulating material 40 is mounted on the plate 23 (Fig. 6) and supports a wire guide 41 also made of insulating material. The guide 41 directs the filler wire, after it leaves the pass between the feed rolls, into the flexible conduit 13 which guides the filler wire to the welding torch.

The filler wire 14 is withdrawn by the feed rolls 25 and 26 from a reel or spool on which it is wound. The reel appears in Fig. 4 and may be of any suitable type having an axial opening by which the reel may be slid onto the reel supporting hub hereinafter described. The reel may comprise a hollow cylinder or drum portion 43 on which the filler wire 14 is wound and positioned between and secured to a pair of side discs or flanges 44 and 45. The drum portion 43 is coaxial with the discs and the discs extend radially outward beyond the drum portion as shown in Fig. 4 to confine the filler wire between them. Each disc has a central opening 46 so that the reel may be slipped laterally onto a rotatable hub 47. The hub has a central opening 48 to receive a stationary spindle 49 which is secured at one end to the frame 16 by a bolt 50. A pair of bushings 51 and 52 force fit in the central opening of the hub 47 to rotate with the hub and serve to rotatably mount the hub on the first spindle 49. A flange 53 welded or otherwise secured to the hub 47 acts as a positioning stop for the reel when it is slipped over the hub. This flange carries an inwardly projecting drive pin 54 which engages in a hole in the side disc 44 of the reel causing the reel and hub 47 to turn as a unit as the filler wire is withdrawn from the reel. A collar or washer 55 positioned on the spindle 49 outwardly of the bushing 52 is spring pressed against the end face of this bushing by a coil spring 56 surrounding the outer end portion of the spindle. The collar 55 may be keyed to the spindle to prevent rotation while permitting free movement longitudinally of the spindle. The spring 56 is compressed between the collar 55 and an adjusting nut 57 threaded on the outer end of the spindle. The pressure exerted by the collar 55 against the end of bushing 52 provides sufficient frictional drag on the hub 47 to prevent the occurrence of backlash as the filler wire is withdrawn from the reel. This drag is adjustable by turning the nut 57.

The central opening through the hub 47 is enlarged at the outer end of the hub as shown at 58 and this portion of the opening is internally threaded to receive an externally threaded annular hub nut 59 having a central opening 60 extending through it. This nut has a flange 61 which retains the reel on the hub 47 when the nut is in position. The outer end portion of the spindle 49, collar 55, nut 57, and coil spring 56, are housed in the enlarged portion 58 of the central hub opening and the opening 60 through the hub nut 59. To position a reel of wire on the hub 47 it is only necessary to remove the hub nut 59, slip the reel on the hub until the inner disc 44 of the reel is in engagement with the flange 53 on the hub nut and the drive pin 54 engages in the hole in the reel disc 44, and then replace the hub nut. When the supply of filler wire is exhausted the hub nut 59 is removed and the empty reel is withdrawn from the hub 47. The reel in its entirety may be made of some inexpensive material such as wood and discarded when empty and replaced by another reel wound with a fresh supply of filler wire, or the empty reel may be rewound with filler wire, if desired, instead of being discarded.

A reel protective case 62 and a backing plate 63 are bolted to each other and to the frame 16. The rear wall 64 of the case 62 and its peripheral cylindrical wall 65 are preferably made of transparent plastic. The front wall 66 is preferably a fabric cover with a slide fastener 67 of the zipper type. To position or remove a reel it is, of course, necessary to open the zipper fastener 67 and move the fabric cover out of the way to give access to the interior of the protective case. When the fabric cover is closed the reel is completely enclosed in the protective case 62. It is beneficial to the welding operation to keep the filler wire clean.

The reel and hub assembly is electrically insulated from the frame 16 by the use of insulating washers and bushings in connection with all bolts that attach the assembly to the frame as shown at 68.

Thus it may be seen that provision is made for supporting a reel of filler wire on a rotatable hub and for mechanically withdrawing the wire from the reel by means of a speed-governed motor and the feed rolls it drives, a regulated friction drag or braking action being applied to the hub during its rotation to prevent backlash.

The filler wire feed unit as thus far described, including the feed rolls and the reel and reel mounting, is substantially the same as that disclosed and claimed in the above-mentioned copending application of Nelson E. Anderson.

If a filler wire is employed that is fairly stiff or resilient it assumes a cast or curvature by reason of its having been wound on the reel, and in that case it may be desirable to provide wire-straightening means to act on the filler wire on its way from the reel to the welding torch to remove the cast. The wire-straightening means is preferably incorporated in the filler wire feed unit itself and may comprise a set of adjustable straightening rolls of the kind now to be described.

Referring to Figs. 6, 8, 9 and 10, two brackets 69 and 70 are bolted to the feed roll plate 23 in such a position as to support a plate 71 and a set of three straightening rolls 72, 73 and 74 at the entrance side of the pair of feed rolls 25 and 26. The plate 71 is secured to the brackets 69 and 70 but is electrically insulated from them by means of insulating material 75 (Fig. 9). Since the plate 71 is spaced a short distance from the plate 23 as shown at 75' in Fig. 6 the plate 71 is completely insulated electrically from the plate 23. The straightening rolls are mounted on the plate 71 as hereinafter described. When the filler wire is passing through the set of straightening rolls, two of the rolls are located at one side of the wire and the third roll is located at the opposite side of the wire between the first two rolls. In the particular arrangement of rolls shown in the drawings the rolls 72 and 73 are mounted so that they are above the filler wire when it passes through the straightening rolls, and the roll 74 is mounted so that it is below the wire. An adjustment is provided to change the distance from the axis of the single roll to the plane of the axes of the pair of rolls. This is preferably accomplished by rotatably mounting the single roll 74 on a spindle 76 secured in a block 77 mounted for limited vertical movement on the plate 71 as shown in Figs. 6 and 9. The rolls 72 and 73 may each be rotatably mounted on a spindle 78 secured directly in the plate 71 (Fig. 10). When so mounted these two rolls 72 and 73 are non-adjustable. An adjusting screw 79 (Figs. 6 and 9) is threaded into the lower portion of the plate 71 and at its upper end engages the lower face of the block 77 in which the single feed roll 74 is mounted. By turning this screw in one direction the block 77 may be raised to bring the roll 74 farther up into the gap between the two rolls 72 and 73, and when the screw is turned in the opposite direction the block 77 will move down to adjust the roll 74 in the opposite direction. A second screw 80 is threaded into the upper portion of plate 71 and its lower end contacts with the upper face of the block 77. This screw serves as a stop screw to limit the upward movement of the block 77. Of course, when the block 77 is in engagement with the stop screw 80 this stop screw must be retracted before the block 77 can be adjusted to a higher position by means of the adjusting screw 79, but the block 77 may be lowered at any time when so desired and brought back to its original adjustment by turning the adjusting screw 79 if in the meantime the position of the stop screw 80 is not altered and if the block 77 is returned to its original position in contact with the lower end of the stop screw. Each of the three wire straightening rolls has a circumferential groove 80' (Figs. 9 and 10) in its periphery to receive and guide the filler wire.

A block 81 (Figs. 6 and 8) is secured to the plate 71 at the entrance side of the straightening rolls and this block has mounted in it a bushing 82. The filler wire 14 leaving the reel passes through this bushing as shown in Fig. 1 and is guided by it to the pass between the lower straightening roll 74 and the two upper straightening rolls 72 and 73. Since the filler wire spans the gap between the two upper rolls 72 and 73, and since the lower roll 74 may be adjusted so that it presses on this spanning portion of the filler wire, it is evident that the three rolls tend to bend the wire as it passes through them. The rolls are arranged so that the bending action is in a direction opposite to the direction of cast or curvature existing in the filler wire. By adjusting the screw 79 the bending action produced on the filler wire by the straightening rolls may be regulated so that it is the proper amount to counteract or eliminate the cast or curvature in the filler wire.

Since the wire-straightening rolls are electrically insulated from the plate 23 (which is grounded) they are also insulated from ground, and since the reel and hub assembly and the feed rolls are also insulated from the main frame (which is insulated from ground), and since the flexible conduit 13 has an insulating cover, the filler wire may be said to be electrically floating all the way to the welding torch or electrode holder.

As later described, there is provided high-frequency means for starting the welding arc, and as previously explained, if high-frequency current is applied while the end of the filler wire is out of contact with the work, the high-frequency current is likely to follow the filler wire to ground and in doing so produce a discharge across the insulation that insulates the feed rolls or the wire-straightening rolls. As soon as such a discharge occurs there is produced a conducting path for the welding current directly to ground and an intense arc is thereby likely to be established at either of these places. To avoid this, a capacitive path to ground is provided either from the tread portions of the feed rolls, or from the plate 71 that supports the straightening rolls, and this path provides a virtual ground to high-frequency and an open circuit to direct current voltages. In the particular apparatus herein described it is more convenient to provide this capacitive path from the plate 71 that supports the straightening rolls. It is diagrammatically represented in Fig. 6 and may comprise a conductor 83 connected between the plate 71 and ground and in which there is connected a condenser 84. The condenser grounds the rolls so far as the high-frequency current is concerned but blocks the passage of welding current and therefore eliminates any conductive path for the welding current through the filler wire to ground when the high-frequency arc starting current is applied.

Fig. 5 is a simplified wiring diagram showing the welding and control circuits. A generator or other source of welding current 85 is electrically connected to the electrode 4 and the work W by means of conductors 86 and 87. The control circuit has its independent source of voltage such as a 115 volt 60 cycle power line. The conductor represented at 88 is connected to one side of this voltage source, and the conductor represented at 89 is connected to the opposite side thereof. The filler wire feed motor 17 is connected across these conductors as shown. Operating coil 90 of a lockout relay is connected across the welding generator 85. This relay controls a pair of normally closed contacts 90a in series with the operating coil 91 of a second relay connected across the conductors 86 and 87 of the welding circuit. The relay 91 controls a pair of normally open contacts 91a in series with the wire feed motor 17. The lockout relay 90 is of such a nature that it pulls in at a voltage greater than welding voltage (during existence of a welding arc) and somewhat less than open circuit voltage. Therefore, on open circuit voltage this relay opens the contacts 90a. Thus, on open circuit voltage the relay 91 is not energized and the circuit to the wire feed motor remains open at the contacts 91a and the filler wire will not feed. Nor will the filler wire feed when the welding generator is not running because there is then no current supply to energize the relay 91 and close the feed motor contacts 91a. However, after the arc has been established either by touching the electrode to the work and retracting it, or by the high-frequency oscillator hereinafter described, the lockout relay 90 will drop out and thereby close the contacts 90a. This energizes the relay 91 which is of such a nature as to pull in at welding voltage and therefore closes the contacts 91a to start the wire feed motor. The relay 91 is also designed to drop out under short circuit conditions and therefore when the electrode is in contact with the work its contacts 91a will be open and the filler wire will not feed.

A high-frequency oscillator represented at 92 establishes a low impedance path between the electrode and work and is controlled by a foot switch 93 connected in the control circuit. In the normal position of the foot switch it completes a circuit from the conductor 88 of the control circuit to the conductor 89 through the coil of a time delay relay 94 and through a pair of contacts 91b which are controlled by the relay 91 and which are normally closed. When the foot switch is depressed it stops the supply of current to the coil of time delay relay 94 and connects the input coil 95 of the oscillator across the conductors 88 and 89 of the control circuit through the closed relay contacts 91b. Thus, when the foot switch is depressed, and when the electrode is brought close enough to the work, the high-frequency discharge between the electrode and the work starts the welding arc. The time delay relay 94 controls a pair of normally closed contacts 94a. When the contacts 94a are closed a circuit is completed from the conductor 88 of the control circuit to conductor 89 through the coil 96 of a solenoid valve which controls the supply of gas to the welding torch and through the coil 97 of a second solenoid valve which controls the supply of cooling water to the welding torch, these two coils both being connected in series with the time delay relay contacts 94a. Energization of the coils 96 and 97 of the solenoid valves opens these valves to start the flow of gas and water to the welding torch and conversely their de-energization closes the valves to stop the flow of the gas and the water.

When the conductors 88 and 89 are energized, for instance by closing a suitable switch on the control panel, gas and water start flowing to the welding torch but only for a short time because the time delay relay 94 (energized through the closed relay contacts 91b and foot switch 93) will open the contacts 94a as soon as its interval of delay has elapsed. When the foot switch 93 is depressed to start the arc by means of the high-frequency oscillator the time delay relay 94 is de-energized and its contacts 94a therefore close to turn on the flow of gas and water to the welding torch. When the arc is started the relays 90 and 91 in the welding circuit function to start the wire feed motor as above described. When the relay 91 closes its contacts 91a and thereby starts the wire feed motor it also opens its normally closed contacts 91b in series with the foot switch 93. These contacts when open break the circuit to the time delay relay 94 thereby permitting its contacts 94a to remain closed and continue the supply of gas and water to the welding torch even though the foot switch 93 is allowed to return to its normal position. If the foot switch were released too soon before the contacts 91b have had time to open, the resulting re-energization of time delay relay 94 would immediately open its contacts 94a and stop the flow of gas and water if it were not for the time delay character of this relay, but its delayed action after such a premature release of the foot switch prevents opening of its contacts 94a before contacts 91b have had time to open and thereby break the circuit to its operating coil. This insures that the flow of gas and water to the welding torch will continue during the welding operation after it has once been started upon the establishment of the arc by depressing the foot switch 93.

The switch represented at 98 in the control circuit is a jog switch connected around the relay contacts 91a so that whenever desired the wire feed motor can be operated to feed filler wire by manually closing this switch and then opening it when the desired amount of filler wire has been fed by the motor.

In order to cause quick response of the lockout relay 90 when the voltage drops from open circuit voltage to welding voltage upon establishment of the arc and thereby cause prompt feeding of the filler wire, an R. C. circuit including a resistance 99 and a condenser 100 is connected between the operating coil of the relay and the conductor 86. On open circuit voltage the condenser is charged and when the operating voltage across the relay coil falls to a value at which the relay should drop out the condenser discharges and provides energy in opposition to the self-induced energy in the coil produced by the decaying flux and which would tend to delay dropping out of the relay. In the condenser branch of the R. C. circuit there is a pair of contacts 90b controlled by the relay 90. These contacts are normally open and are therefore closed under open circuit conditions and when the condenser 100 is being charged as above described. However, when the relay 90 drops out either after short circuit or after the welding arc has been established by high frequency it opens the contacts 90b and this prevents surges of current during the welding operation from causing the relay to pull in and thereby stop the feed of filler wire by opening its contacts 90a.

A condenser 101 is connected between the conductors 86 and 87 of the welding circuit in such a way as to form a by-pass for the high-frequency arc starting current which prevents the high-frequency current from passing through and damaging the welding generator and relays located to the left of this by-pass in Fig. 5.

In order that the feeding action of the filler wire may produce the proper propulsion effect on the welding torch to cause it to automatically move along the surface of the work-piece in the manner contemplated by the invention, the end of the filler wire 14 should be fed to the welding zone in the manner illustrated in Fig. 2. During the welding operation, the extreme end portion of the filler wire is, of course, continually melted by the heat of the arc as fast as it is fed to the welding zone and merges with the molten metal in the weld puddle P. The arms 10 and 11 of the bracket 9 should support the guide tube 12 for the filler wire so that after the weld puddle has been formed the solid unmelted end portion of the filler wire contacts with a solid portion of the surface of the work W adjacent the forward edge of the weld puddle. The extreme end of this unmelted portion of the filler wire continually fuses and the work-piece engaging portion of the filler wire is either bonded to or frictionally sticks to the metal of the work-piece and therefore the reaction of this portion of the filler wire against the work surface during feeding of the filler wire produces a propulsion effect on the welding torch which moves it along the work surface in a direction opposite to the direction in which the filler wire is fed.

The more nearly parallel the unmelted end portion of the filler wire is to the work surface the better will be the propulsion effect on the welding torch. Therefore, the filler wire should not form an angle of more than 20° with the surface of the work-piece. The best results have been obtained when this angle is not more than 10°. The wire, of course, should be stiff enough to produce the necessary reaction force to propel the welding torch. If it is quite stiff and resilient, it may be desirable to provide wire straightening rolls of the kind above described to remove the cast or curvature assumed by the wire because of its having been wound on the reel of the filler wire feeding unit, but the wire straightening rolls are not always necessary and may be omitted if desired. Relatively soft filler wire that does not assume a cast or curvature because of its reeled condition requires no straightening after it leaves the reel. Mild steel filler wire having zero temper and a diameter of 1/16" to 3/32" has been found to be stiff enough to produce the desired reactive force to propel the welding torch along the work surface as contemplated by the invention and soft enough so that the use of wire straightening rolls is not essential. Such a wire will support the weight of a manual welding torch or electrode holder weighing about 10 oz. so that it is only necessary for the operator to grip the welding torch with sufficient force to steady it and make sure that the arc follows the seam to be welded. Since the filler wire supports the torch the spaced relation between the tip of the electrode and the work will remain substantially constant. But regardless of whether the filler wire supports the entire weight of the torch the torch will be automatically propelled along the work surface by the feeding action of the filler wire.

The rate at which the filler wire is fed to the welding zone may be varied by adjusting the governor 20 on the feed motor 17. The filler wire should be fed at a rate that will deposit the filler metal in the weld at the proper rate to produce a satisfactory weld. The travel speed of the welding torch will, of course, depend upon the rate of feed of the filler wire. The end of the filler wire is preferably substantially parallel with the work surface, and the travel speed of the torch is equal to the rate of feed of the filler wire. It has been found that the feeding of the filler wire will have the proper propulsion effect on the welding torch throughout a fairly wide range of filler wire feed speeds.

The invention is primarily an improvement on manual welding torches because it converts that kind of a torch into one that is automatically propelled along the work surface merely by the feeding action of the filler wire, but as previously stated the welding torch may, if desired, be mounted on a carriage which will permit the torch to move freely along the seam to be welded so that the feeding action of the filler wire will propel both the carriage and the torch, the carriage being guided by a track or in some other suitable way to cause the torch to follow the seam to be welded.

In the preferred embodiment of the invention as shown in the drawings the filler wire is fed through the longitudinally non-extensible, flexible casing 13 which has its wire inlet end (the end adjacent the feed rolls 25, 26) fixed with respect to the work-piece and its free end carried by and fixed with respect to the torch 1 by bracket 10. Flexible casing 13 acts like a Bowden wire casing to closely confine the filler wire throughout the length of the casing and at the same time permits free longitudinal movement of the filler wire through it. While I do not wish to be confined to any particular theory as to why, in such an arrangement, the feeding of the filler wire causes the torch to be propelled along the seam to be welded, the reason for it is believed to be as follows: Since the end of the filler wire frictionally sticks or bonds to the metal of the work-piece at the edge of the weld puddle, as above stated, there is produced, in effect, a stop or abutment at this place against which the filler wire is fed by the feed rolls. This produces a reaction which, in the particular apparatus illustrated in the drawings, cannot move the feed unit 2' and the feed rolls in the direction of the reaction force since they are fixed relative to the work-piece so the reaction causes the filler wire to bend or buckle. In other words, the feed rolls, during operation, are continually feeding more and more filler wire into a given fixed distance between the feed rolls and the abutment, and hence the filler wire between these two points must necessarily bend. The flexible casing 13 bends with the filler wire thus foreshortening the distance between the fixed end of the casing and the end which is attached to the torch and causing the movable end, i. e., the end which is fastened to the torch, to move toward the fixed end and in so doing move the torch with it and thus propel the torch along the seam to be welded. The particular type of apparatus shown in the drawings, while simple, has been found very effective in operation, and can produce a relatively large reaction force with a soft small diameter wire because the filler wire is supported throughout substantially its entire length from the drive rolls to the weld puddle. Only the short length which projects from the free or exit end of the guide tube 12 to the point of abutment between the filler wire and the work-piece is subject to bending or buckling relative to this guide tube or relative to the flexible casing 13.

While the invention has been described in its application to an arc welding torch with the non-consuming type electrode, as shown at 4 (Fig. 1), it is also applicable to an arc welding torch in which the electrode 4' (Fig. 2) may be the consuming type electrode such as disclosed in Patent No. 2,504,868, Muller et al.; and the invention is also applicable to a gas torch, such as an oxyacetylene torch, in which the heat for welding is supplied by a gas flame instead of an electric arc.

Although I have illustrated and described my welding apparatus in its preferred form, various changes can be made without departing from the spirit or scope of the invention as defined in the following claims.

I claim:

1. Arc welding apparatus comprising an electrode, a source of welding current to which the electrode and the work may be electrically connected whereby a welding arc may be maintained between the tip of the electrode and the work, means for feeding filler wire to the welding zone including rolls between which the filler wire passes, at least the tread portion of the rolls being electrically insulated from ground, high-frequency arc starting means, and an electric path from the treads of said rolls to ground including a condenser which grounds said roll treads to high-frequency current which might pass to the filler wire when starting the arc by the high-frequency arc starting means and which prevents the passage of welding current through the filler wire to ground such as might otherwise occur if the high-frequency current produced a discharge across the insulation that insulates the roll treads from ground.

2. Arc welding apparatus comprising an electrode, a source of welding current to which the electrode and the work may be electrically connected whereby a welding arc may be maintained between the tip of the electrode and the work, means for feeding filler wire to the welding zone including feed rolls and a set of wire-straightening rolls, at least the tread portion of the feed rolls being electrically insulated from ground, a support for the straightening rolls electrically insulated from ground, high-frequency arc starting means, and a condenser electrically connected between said support and ground which grounds the wire-straightening rolls to high-frequency current which might pass to the filler wire when starting the arc by the high-frequency arc starting means and which prevents the passage of welding current through the filler wire to ground such as might otherwise occur if the high-frequency current produced a discharge across the insulation that insulates the feed roll treads from ground or across the insulation that insulates the wire-straightening roll support from ground.

3. Arc welding apparatus comprising an electrode, a source of welding current to which the electrode and the work may be electrically connected whereby a welding arc may be maintained between the tip of the electrode and the work, means for feeding filler wire to the welding zone, a set of wire-straightening rolls positioned to act on the filler wire on its way to the welding zone, a support for the straightening rolls electrically insulated from ground, high-frequency arc starting means, and a condenser electrically connected between said support and ground which grounds said straightening rolls to high-frequency current which might pass to the filler wire when starting the arc by the high-frequency arc starting means and which prevents the passage of welding current through the filler wire to ground such as might otherwise occur if the high-frequency current produced a discharge across the insulation that insulates the straightening roll support from ground.

(References on following page)

References Cited in the file of this patent

UNITED STATES PATENTS

| | | |
|---|---|---|
| 1,508,711 | Noble | Sept. 6, 1924 |
| 1,644,896 | Busekist | Oct. 11, 1927 |
| 1,904,086 | Sandelowsky | Apr. 18, 1933 |
| 2,058,169 | Montague | Oct. 20, 1936 |
| 2,182,575 | Baird | Dec. 5, 1939 |
| 2,280,879 | Anderson | Apr. 28, 1942 |
| 2,340,093 | White | Jan. 25, 1944 |
| 2,360,160 | Pickhaver | Oct. 10, 1944 |
| 2,405,542 | Wassell | Aug. 6, 1946 |
| 2,504,868 | Muller | Apr. 18, 1950 |
| 2,510,205 | Baird | June 6, 1950 |
| 2,510,207 | Behnke | June 6, 1950 |
| 2,550,495 | Pilia | Apr. 24, 1951 |
| 2,571,684 | Craven | Oct. 16, 1951 |